United States Patent [19]

Dille et al.

[11] 4,390,347
[45] Jun. 28, 1983

[54] TRIM CONTROL PROCESS FOR PARTIAL OXIDATION GAS GENERATOR

[75] Inventors: Roger M. Dille, Port Arthur; Leigh R. Middleton, Beaumont, both of Tex.; Albert Brent, Huntington, N.Y.; Allen M. Robin, Anaheim, Calif.

[73] Assignee: Texaco Inc., White Plains, N.Y.

[21] Appl. No.: 333,158

[22] Filed: Dec. 21, 1981

[51] Int. Cl.³ .............................................. C10J 3/46
[52] U.S. Cl. .................................. 48/197 R; 48/206; 48/209; 48/215; 252/373; 364/500
[58] Field of Search .............. 364/500; 48/197 R, 200, 48/201, 203, 206, 209, 212, 215, DIG. 7; 252/373

[56] References Cited

U.S. PATENT DOCUMENTS 2,941,877  6/1960  Grahame ............................ 48/215

Primary Examiner—Peter F. Kratz
Attorney, Agent, or Firm—Carl G. Ries; Robert A. Kulason; Albert Brent

[57] ABSTRACT

Trim control of a partial oxidation gas generator for the production of synthesis gas, reducing gas, or fuel gas is effected by two improved control schemes which are automatically operated separately or in sequence. The control systems include sensors sensing the flow rate of the feedstreams and analyzers which provide signals corresponding to the wt. % carbon in the effluent gas quench cooling and scrubbing water for use in controlling the particulate carbon in the effluent gas stream, and/or signals corresponding to the mole fractions of $CO_2$, $CH_4$, $CO$ and $H_2$ (dry basis) in the cooled and cleaned effluent gas stream for use in controlling the temperature in the reaction zone. The signals from the sensors and analyzers are provided to the system control unit which computes values that represent the relative difference between the actual and desired carbon-make and/or the actual temperature in the reaction zone, and the relative difference between the actual and desired temperature in the reaction zone. The actual temperature is determined as a function of the methane equilibrium constant. These values are automatically compared with set point values and when adjustments are necessary, signals from the system control unit are provided to a flow rate regulating means which adjusts the flow rate of the free-oxygen containing gas by a small determined amount for control of the particulate carbon and/or to a flow rate regulating means which adjusts the flow rate of the temperature moderator by a small determined amount for control of the temperature in the reaction zone.

17 Claims, 5 Drawing Figures

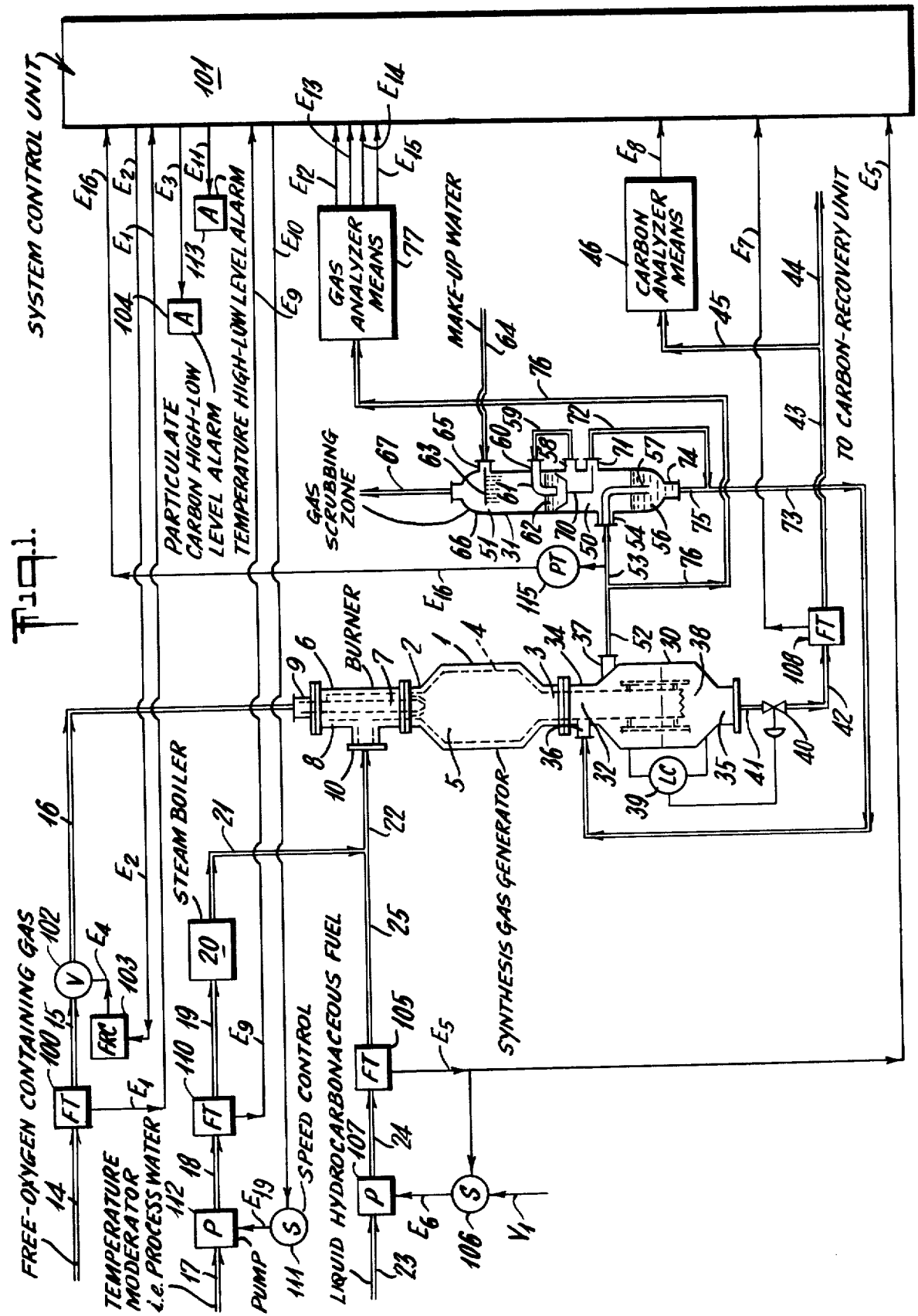

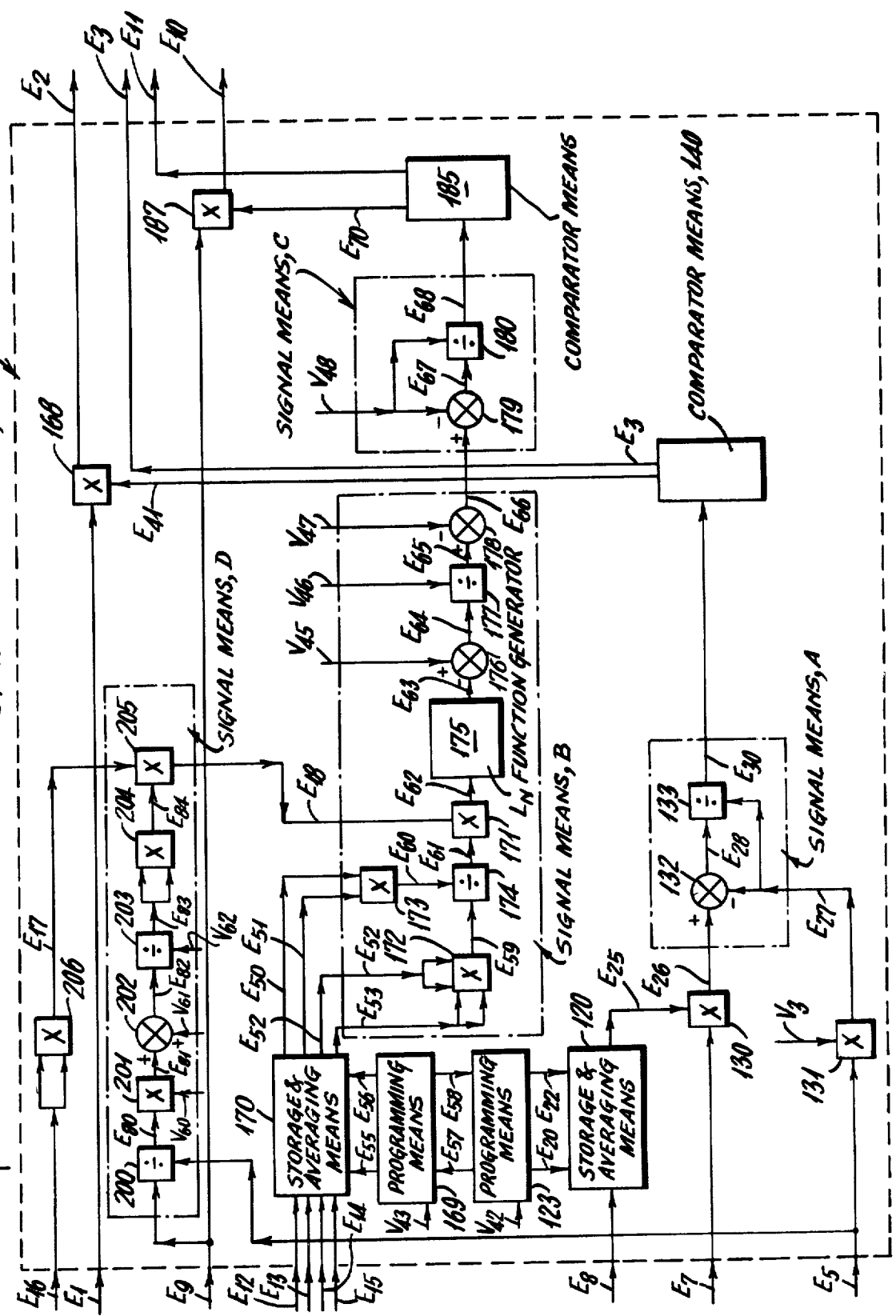

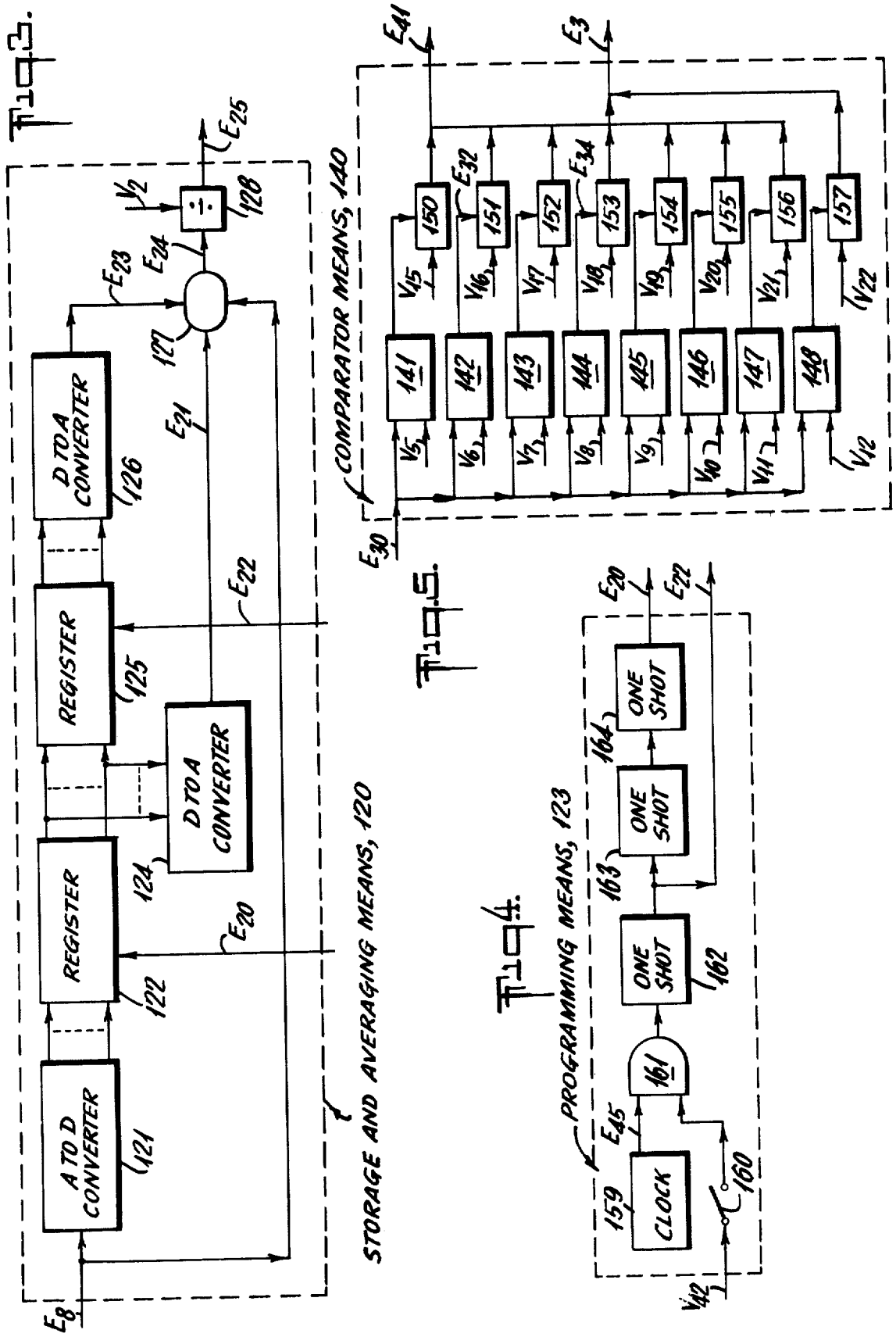

TRIM CONTROL PROCESS FOR PARTIAL OXIDATION GAS GENERATOR

BACKGROUND OF THE INVENTION

This invention relates to a system and method for controlling a partial oxidation gas generator.

In the partial oxidation process for the production of synthesis gas, a specific amount of particulate carbon is maintained in the reaction zone in order to prevent damage to the refractory lining from the nickel and vanadium compounds which are introduced with the liquid hydrocarbonaceous fuel feedstream. However, excess particulate carbon in the gas stream will increase gas cleaning costs and adversely affect downstream operations. It is also necessary in the partial oxidation process to maintain the temperature in the reaction zone within a narrow range so as to avoid substantial changes in the chemical composition of the product gas.

Coassigned U.S. Pat. No. 2,941,877 pertains to a scheme for controlling a gas generator based on the amount of $CH_4$ produced. However, in that process comparatively large adjustments to the oxygen to fuel ratio were made to change the temperature in the reaction zone; and, this would produce a corresponding opposite effect on the carbon-make. Thus, an adjustment made to correct the temperature may readily put the carbon-make out of specification. In contrast, by means of the improved subject method as provided herein, the partial oxidation gas generator may be run continuously while the carbon-make and/or the temperature in the reaction zone are closely controlled.

SUMMARY OF THE INVENTION

This is a system and method for automatically trim controlling the amount of free-carbon particulate produced and/or the temperature in the reaction zone in a process for the partial oxidation of a liquid hydrocarbonaceous fuel with a free $O_2$-containing gas in the presence of a temperature moderator.

The liquid hydrocarbonaceous fuel is introduced at a predetermined rate into the refractory-lined reaction zone of a free-flow noncatalytic partial oxidation gas generator for the production of synthesis gas, reducing gas or fuel gas. In this trim control scheme, the amount of free particulate carbon produced in the reaction zone of the partial oxidation gas generator is controlled in the following manner. The stream of carbon-water dispersion that is discharged from the effluent gas quench cooling and scrubbing zone is automatically sampled and analyzed by a conventional carbon analyzer means. Over a predetermined period of time, a plurality of successive samples of the stream of carbon-water dispersion are analyzed and corresponding signals responsive thereto are generated. Each successive signal is representative of the weight fraction of particulate carbon. In a storage and averaging means, a value representing the average weight fraction of particulate carbon is then automatically determined. A signal corresponding to this value is multiplied by a signal representing the current flow rate of the stream of carbon-water dispersion to provide a signal corresponding to the actual carbon-make. A signal corresponding to the desired carbon-make is determined by design conditions and depends on such factors as the desired rate of carbon supplied by the liquid hydrocarbonaceous fuel, economics and refractory life. A value representing the relative difference between the actual and desired carbon-make is then automatically computed, and a corresponding signal is provided to a comparator means. The % change in the current rate of flow of the free-oxygen containing gas stream is then automatically determined in the comparator means in order to bring the actual and desired carbon-make closer together. A corresponding signal is multiplied by a signal representing the current flow rate of the free-oxygen containing gas feedstream. A corresponding adjustment signal is then provided to a flow rate regulating means that controls the free-oxygen containing gas feedstream. For example, a signal from a multiplying means resets a flow recorder-controller which provides an adjustment signal to regulate a control valve in the free-oxygen containing gas feedline. By this means, the flow rate of the free-oxygen containing gas stream is automatically adjusted by a corresponding small percentage.

The second control scheme by which the temperature in the reaction zone is automatically controlled may be employed separately or preferably in sequence after the previously described carbon control adjustment and after conditions in the reaction zone of the partial oxidation gas generator have stabilized. In such case, the quenched effluent gas stream leaving said reaction zone is quench cooled and scrubbed with water in a gas quench cooling zone, and then automatically sampled and analyzed by a conventional gas analyzer means. Over a predetermined period of time, a plurality of successive samples of the cooled and cleaned effluent gas stream are analyzed and corresponding sets of signals responsive thereto are generated. Each successive set of signals is representative of the mole fractions (dry basis) of $CO_2$, $CH_4$, $CO$ and $H_2$. In a storage and averaging means the average mole fractions of $CO_2$, $CH_4$, $CO$ and $H_2$ (dry basis) are automatically determined and corresponding sets of signals are provided. The actual temperature in the reaction zone is then determined as a function of the methane equilibrium constant. Values for the actual temperature in the reaction zone of the gas generator, and the relative difference between the actual and desired temperatures in the reaction zone are automatically computed and signals corresponding to these values are provided to a comparator means. A value representing the % change to be made in the current rate of flow of the temperature moderator feedstream i.e. $H_2O$ in order to bring the actual and desired temperature in the reaction zone closer together is then automatically determined. A corresponding signal is multiplied by a signal representing to the current flow rate of the temperature moderator feedstream. A corresponding signal is then provided to a flow rate regulating means that automatically controls the flow rate of the temperature moderator feedstream. For example, a signal may be provided to reset a speed control that provides an adjustment signal to regulate the speed of a positive displacement pump in the temperature moderator feedline. By this means, the current flow rate of the temperature moderator stream is automatically adjusted by a corresponding small percentage. Alternatively, the operator is warned if an adjustment signal would increase or decrease the flow rate of the free-oxygen containing gas and/or the temperature moderator feedstream more than a specific amount. In such case, no adjustment to the flow rate is made but a high-low level alarm is activated.

In a preferred embodiment, the two control schemes are employed in sequence according to the following steps, which are repeatedly cycled: (1) small determined adjustment to the flow rate of the free-oxygen containing gas feedstream, (2) gasifier stabilization period, (3) small determined adjustment to the flow rate of the temperature moderator feedstream, and (4) gasifier stabilization period.

The objects and advantages of the invention will appear hereafter from consideration of the detailed description which follows, taken together with the accompanying drawings, wherein embodiments of the invention are illustrated by way of example. It is to be expressly understood, however, that the drawings are for illustration purposes only, and are not to be construed as defining the limits of the invention.

DESCRIPTION OF THE DRAWINGS

FIG. 1 is a partial simplified block diagram and a partial schematic of a control system, constructed in accordance with the present invention, for controlling a partial oxidation synthesis gas generator.

FIG. 2 is a detailed block diagram of the system control unit shown in FIG. 1.

FIGS. 3, 4 and 5 are detailed block diagrams of a storage and averaging means, comparator means, and programming means shown in FIG. 2.

DESCRIPTION OF THE INVENTION

Partial oxidation noncatalytic gas generators require steady, stable flows of the feedstreams comprising free-oxygen containing gas, liquid hydrocarbonaceous fuel, and temperature moderator at precisely set amounts. This is necessary for the conversion of the liquid hydrocarbonaceous fuel to synthesis gas, reducing gas, or fuel gas in a steady, efficient and safe manner.

By means of the subject control system, when an adjustment up or down to the flow rate of a feedstream to the gasifier is required, such as in response to a small change in the quality of the feedstock, a limited adjustment may be made in small steps. Each adjustment is then followed by a gasifier stabilization period. Further, the determination for the extent of each adjustment if any is based on the average of a plurality of successive samples analyzed over a period of time. This will minimize the effect of any momentary changes or surges in the system.

Synthesis gas, reducing gas, and fuel gas are preferably made by the partial oxidation of a hydrocarbonaceous fuel in a noncatalytic free-flow synthesis gas generator. For example, a liquid hydrocarbonaceous fuel feedstock such as petroleum oil, is reacted with a free-oxygen containing gas optionally in the presence of a temperature moderator at an autogenously maintained temperature within the range of about 1700° to 3000° F. and at a pressure in the range of about 1 to 250 atmospheres absolute.

The gas generator for carrying out the partial oxidation reaction in the subject process preferably consists of a compact, unpacked, free-flow noncatalytic, refractory lined steel pressure vessel of the type described in co-assigned U.S. Pat. No. 2,809,104 issued to D.M. Strasser et al, which patent is incorporated herewith by reference. The raw synthesis gas stream from the gas generator may have the following composition in mole %: $H_2$ 20 to 80; CO 60 to 15; $CO_2$ 3 to 30; $H_2O$ 5–15; $CH_4$ 0.01 to 20; $N_2$ nil to 60; $H_2S$ nil to 5.0; COS nil to 0.2; Ar nil to 2; and from 0.1 to 20 wt. % of particulate carbon (basis weight % of C in the hydrocarbonaceous fuel). After quenching and/or scrubbing with water, the mole % $H_2O$ in the gas stream is increased and is present in the range of 20–60. Accordingly, the mole % of the other gaseous constituents are decreased proportionately.

A wide variety of liquid hydrocarbonaceous fuels is suitable as feedstock for the partial oxidation process, either alone or in combination with each other or with particulate carbon. The liquid hydrocarbonaceous feeds include fossil fuels such as: various liquid hydrocarbon fuels including petroleum distillates and residua, gasoline, kerosine, naphtha, asphalt, gas oil, residual fuel, reduced crude, fuel oil, crude petroleum, coal tar, coal derived oil, shale oil, tar sand oil, liquefied petroleum gas, aromatic hydrocarbons (such as benzene, toluene, xylene fractions), cycle gas oil from fluid-catalytic-cracking operations, furfural extract of coker gas oil, and mixtures thereof. Suitable liquid hydrocarbon fuel feeds as used herein are by definition liquid hydrocarbonaceous fuel feeds that have a gravity in degrees API in the range of about −20 to 100.

Further, included also by definition as a liquid hydrocarbonaceous fuel are liquid oxygenated hydrocarbonaceous materials, i.e. liquid hydrocarbon materials containing combined oxygen, including carbohydrates, cellulosic materials, oxygenated fuel oil, waste liquids and by-products from chemical processes for oxygenated hydrocarbonaceous materials, alcohols, ketones, aldehydes, organic acids, esters, ethers, and mixtures thereof. Further, a liquid oxygenated hydrocarbonaceous material may be in admixture with one of said liquid petroleum materials.

Further, included also by definition as a liquid hydrocarbonaceous fuel are pumpable slurries of de-ashed or low-ash containing solid carbonaceous fuels i.e. less than about 1.0 wt. % of ash, from the group consisting of coal, lignite, coke from coal, coal char, coal liquefaction residues, particulate carbon, petroleum coke, carbonaceous solids derived from oil shale, tar sands and pitch, concentrated sewer sludge, bits of garbage, rubber, and mixtures thereof in a liquid carrier from the group consisting of water, liquid hydrocarbon fuel, and mixtures thereof.

The free-oxygen containing gas may be selected from the group consisting of air, oxygen-enriched air (22 mole percent $O_2$ and higher), and preferably substantially pure oxygen (95 mole percent $O_2$ and higher). The amount of nitrogen in the product gas may be substantially reduced or eliminated by using substantially pure oxygen. In the reaction zone, the ratio of the atoms of oxygen to atoms of carbon in the feed is in the range of about 0.7 to 1.5. Alternatively, this ratio may be expressed as about 0.7 to 1.5 atoms of oxygen per atom of carbon.

$H_2O$, in liquid or gaseous phase, is preferably introduced into the reaction zone to help control the reaction temperature, to act as a dispersant of the hydrocarbonaceous fuel fed to the reaction zone, and to serve as a reactant to increase the relative amount of hydrogen produced. Other suitable temperature moderators include $CO_2$-rich gas, a cooled portion of effluent gas from the gas generator, cooled off-gas from an integrated ore-reduction zone, nitrogen, and mixtures thereof. The weight ratio $H_2O$/fuel in the reaction zone may be in the range of about 0 to 5.0, such as about 0.15 to 3.0.

Preheating of the reactants is optional but generally desirable. For example, a hydrocarbon oil and steam may be preheated to a temperature in the range of about 100° to 800° F. and the oxygen-free containing gas may be preheated to a temperature in the range of about 100° to 1000° F.

It is normal to produce from hydrocarbonaceous fuel feeds by partial oxidation about 0.1 to 20 weight percent of unreacted particulate carbon or free carbon soot (basis wt. % of carbon in the hydrocarbonaceous fuel feed). This unreacted particulate carbon is also referred to herein as the carbon-make. The free carbon soot is produced in the reaction zone of the gas generator, for example, by cracking hydrocarbonaceous fuel feeds. Carbon soot will prevent damage to the refractory lining in the generator by constituents which are present as ash components in residual oils. With heavy crude or fuel oils, it is preferable to leave about 1 to 3, such as 2, weight percent of particulate carbon (basis wt. % carbon in the liquid hydrocarbonaceous fuel feed) in the product gas. With lighter distillate oils, progressively lower carbon soot yields are maintained.

In one embodiment of our invention, the hot gaseous effluent from the reaction zone of the synthesis gas generator may be quickly cooled below the reaction temperature to a temperature in the range of about 180° to 700° F. by direct quenching in water in a gas-liquid contacting or quenching zone. For example, the cooling water may be contained in a quench vessel or chamber located immediately downstream from the reaction zone of said gas generator. An interconnecting passage between the reaction zone and the quench zone through which the hot effluent gases may pass substantially equalizes the pressure in the two zones. Recycle water from the carbon recovery zone or lean carbon-water dispersion from the gas scrubbing zone may be introduced through a spray ring at the top of the quench zone. Large quantities of steam are generated in the quench vessel and saturate the process gas stream. For a detailed description of a quench chamber suitable for oil feeds, see coassigned U.S. Pat. No. 2,896,927 issued to R. E. Nagle et al, which is herewith incorporated by reference.

Substantially all of the solids are scrubbed from the effluent gas. A dispersion of unconverted particulate carbon and quench water is thereby produced. Any residual solids in the cooled and scrubbed effluent synthesis gas leaving the quench chamber may be removed by means of an additional water scrubbing in a conventional venturi or jet scrubber.

Alternately, the hot effluent gas stream from the reaction zone of the synthesis gas generator may be cooled to a temperature in the range of about 240° to 700° F. by indirect heat exchange in a waste heat boiler. The entrained solid particles may be then scrubbed from the effluent synthesis gas by contacting and further cooling the effluent stream of synthesis gas with quench water in a gas-liquid contact apparatus, for example, a quench dip-leg assembly, a spray tower, venturi, or jet scrubber, bubble plate contractor, packed column, or in a combination of said equipment. For a detailed description of cooling synthesis gas by means of a waste heat boiler and a scrubbing tower, reference is made to coassigned U.S. Pat. No. 2,980,523 issued to R. M. Dille et al and incorporated herewith by reference.

It is desirable to maintain the concentration of particulate carbon in the gas cooling and scrubbing water streams in the range of about 0.5 to 2 wt. % and preferably below about 1.5 wt. %. In this manner, the dispersion of carbon in water will be maintained sufficiently fluid for easy pumping through pipelines and for further processing. The temperature in the scrubbing zone is in the range of about 180° to 700° and preferably in the range of about 250° to 550° F. The pressure in the scrubbing zone is in the range of about 1–250 atmospheres, and preferably at least 25 atmospheres. Suitably the pressure in the scrubbing zone is about the same as that in the gas generator, less ordinary pressure drop in the lines.

It is important with respect to the economics of the process that the particulate carbon be removed from the carbon-water dispersion and the resulting clear water to be recycled and reused for cooling and scrubbing additional particulate carbon from the effluent gas stream from the gas generator. Conventional carbon recovery systems may be employed, such as that described in coassigned U.S. Pat. No. 4,134,740 issued to Charles P. Marion et al.

The cooled and cleaned synthesis gas, reducing gas, or fuel gas may be optionally subjected to conventional purification processes for removal of any unwanted gases.

A more complete understanding of the invention may be had by the discussion which follows and reference to the accompanying schematic drawings which show the subject invention in detail. Although the drawings illustrate preferred embodiments of the invention, it is not intended to limit the subject invention to the particular apparatus or materials described.

Referring to the figures in the drawings, FIG. 1 is a schematic representation of one embodiment of the invention showing control means for the continuous operation of a synthesis gas generator while controlling the flow rate of the free-oxygen containing gas feedstream and the feedstream of temperature moderator.

In FIG. 1 there is shown a system for controlling a conventional type free-flow partial oxidation gas generator 1 for the production of synthesis gas, reducing gas or fuel gas. Gas generator 1 is a vertical pressure vessel with a coaxial upper flanged inlet 2 and lower flanged outlet 3. The inside walls are lined with refractory 4 and contain reaction zone 5. Coaxial burner 6 is mounted in upper inlet 2 and comprises coaxial central conduit 7 and annular passage 8. There is also upper inlet 9 to central conduit 7 and side inlet 10 to annular passage 8.

The feedstreams to burner 6 comprise free-oxygen containing gas in lines 14–16, temperature moderator, for example, water in lines 17–19 and liquid hydrocarbonaceous fuel in lines 23–25. Water is preferably converted into steam by means of steam boiler 20. Optionally, steam boiler 20 may be by-passed by the temperature moderator in line 19. The feedstreams in lines 21 and 25 are mixed together in line 22. The mixture is passed through side inlet 10 of burner 6. In one embodiment, preheated feedstreams of water and liquid hydrocarbonaceous fuel are mixed together and the mixture is then heated or vaporized prior to being passed through the burner inlet. The free-oxygen containing gas passing through central conduit 7 and the mixture of liquid hydrocarbonaceous fuel and temperature moderator passing through annular passage 8 impinge together producing a finely dispersed mixture which undergoes partial oxidation in reaction zone 5.

The hot effluent gas stream from the reaction zone is suddenly contacted with water and cooled below the reaction temperature. The effluent gas stream is also cleaned and scrubbed free of entrained particulate carbon with water. This cooling and cleaning takes place in the subject embodiment in a quench cooling and scrubbing zone comprising conventional quench tank 30 and scrubbing column 31. In another embodiment, the cooling takes place in a waste heat boiler followed by cleaning and scrubbing with water. Quench tank 30 is located directly below gasifier 1 and comprises dip tube 32, splash ring 33, upper flanged inlet 34 connected to lower outlet 3, bottom central carbon-water dispersion outlet 35, upper side water inlet 36, and upper side gas outlet 37. A pool of water 38 is located in the bottom of quench tank 30. The level of the water is controlled by level controller 39 and valve 40 in carbon-water dispersion outlet line 41. The carbon-water dispersion discharges through lines 42–44 into a conventional carbon recovery system. A portion of the carbon-water dispersion is sampled by being withdrawn through line 45 and analyzed for carbon in conventional carbon analyzer 46.

The hot effluent gas stream from the reaction zone passes down through dip-tube 32 into quench water 38 where the gas stream is cooled and washed with water. Most of the entrained particulate carbon is removed from the gas stream to form a carbon-water dispersion with quench water 38. The gas stream bubbles up through quench water 38 and out through upper side outlet 37. When necessary a second gas cleaning stage may be included such as vertical gas scrubbing column 31. Gas scrubbing column 31 comprises lower compartment 50 50 and upper compartment 51, in tandem. The effluent gas stream from quench tank 30 passes through lines 52 and 53 and enters lower compartment 50 through lower inlet 54. The effluent gas stream is introduced below the surface of the pool of water 56 in the bottom of compartment 50 by way of dip-tube 57. The gas stream leaves through outlet 58 and passes through line 59, inlet 60, and dip-tube 61 into pool of water 62 in the bottom of upper compartment 51. The gas stream bubbles up through water 62 and receives a final washing with fresh make-up water by means of sparger 63 at the top of compartment 51. The fresh make-up water enters through line 64 and inlet 65. The cooled and cleaned effluent gas stream leaves through upper outlet 66 and line 67 and may be subjected to further gas purification or process steps downstream in the process. Depending on the gas composition, the cooled and cleaned effluent gas stream, with or without further processing, may be used as synthesis gas, reducing gas, or fuel gas. Scrub water 62 leaves through line 70 at the bottom of upper compartment 51 and passes through outlet 71, line 72 and mixes in line 73 with scrub water 56 which leaves lower compartment 50 through bottom outlet 74 and line 75. The dilute carbon-water dispersion in line 73 is passed through inlet 36 at the top of quench tank 30 and cools dip-tube 32 by flowing down its inside surface.

The cooled and cleaned effluent gas stream in line 52 is sampled and a portion is withdrawn through line 76. This gas is analyzed by means of conventional gas analyzer 77 for mole fractions of $CO_2$, $CH_4$, $CO$ and $H_2$.

In the first trim control scheme, the actual rate of particulate carbon produced in the reaction zone of the gas generator i.e. carbon-make may be automatically brought closer to the desired rate of particulate carbon production established by design conditions by adjusting the flow rate of the free-oxygen containing gas feedstream stepwise up or down by discrete small amounts. The flow rate of the free-oxygen containing gas feedstream to gas generator, is controlled by sensing the flow rate of the free-oxygen containing gas in line 14 with a conventional type flow rate sensor 100 which provides a signal $E_1$, corresponding to the flow rate of the stream of free-oxygen containing gas in line 14–16 on its way to burner 6. Signal $E_1$, which corresponds to said flow rate, is provided to system control unit 101 which automatically provides signals $E_2$ or $E_3$ depending on the magnitude of a value representing the relative difference between the actual and desired rate of particulate carbon produced in the reaction zone, i.e. carbon-make. The value for the relative difference in carbon-make is determined in system control unit 101 and represents the (Actual-Desired Carbon-Make) divided by Desired Carbon Make. The value for the desired carbon-make may be determined by conventional calculations and is dependent on such factors as the composition and flow rate of the liquid hydrocarbonaceous fuel, the desired weight fraction of carbon in the liquid hydrocarbonaceous fuel feed which is entrained as particulate carbon in the effluent gas stream leaving the reaction zone, economics and refractory life.

Signal $E_2$ corresponds to a specific trim adjustment to the current free-oxygen containing gas flow rate and is provided to a flow rate regulating means. For example, signal $E_2$ adjusts the set point of flow recorder-controller 103 to enable flow recorder-controller 103 to provide signal $E_4$ to open or close control valve 102 a small specific amount. By this means the flow rate of the stream of free-oxygen containing gas in line 14 is automatically regulated a specific amount corresponding to a specific range of values representing the magnitude of the relative difference between the actual and desired carbon-make in the reaction zone. Thus, for each adjustment the flow rate of the free-oxygen containing gas stream in line 14 may be increased or decreased a specific small amount. For example, by this means the flow rate of the free-oxygen containing gas stream may be adjusted in the range of about 0 to ±1.5 percent in predetermined small amounts. In one embodiment, the signal from the system control unit drives a stepping motor to a desired position. The stepping motor, in turn, controls or regulates the output from a pneumatic or electrical converter to an analog controller or valve actuator.

Alarm signal $E_3$ from system control unit 101 is provided when a value representing the relative difference between the actual and desired rates of particulate carbon produced in the reaction zone is either higher or lower than a specific amount i.e. ±0.25. When signal $E_3$ is provided, alarm 104 which signals a high or low level of particulate carbon in the reaction zone is actuated. For example, should there be called for an adjustment to the current free-oxygen containing gas flow rate of a magnitude that exceeds plus or minus 1.5%, then said adjustment is not made but instead the high or low level alarm, respectively will be actuated. The alarm may be visual, auditory, or both. By this means, changes in feedstreams as well as equipment performance and efficiency are quickly detected. Further, it allows time for the operator to adjust controls or to put equipment in or out of service for any of the following reasons: to improve plant operation, to prevent costly damage to the equipment or to the refractory lining of the gas generator, to prevent the production of off-standard product gas, or to prevent the production of excess free particulate carbon which increases the cost of carbon separation.

The value representing the relative difference between the actual and desired carbon-make in the reaction zone is determined automatically in system control unit 101 and compared therein with manually or computer calculated and inserted values in order to automatically generate adjustment signal $E_2$ or alternatively alarm signal $E_3$. Other process variables which are introduced into system control unit 101 for these determinations include signals corresponding to the flow rates for the free-oxygen containing gas in line 14, liquid hydrocarbonaceous fuel in line 23, and the carbon-water dispersion discharged from quench tank 30; and also signals corresponding to the weight fraction of carbon in the carbon-water dispersion as determined by carbon analyzer 46, the fraction of carbon in the liquid hydrocarbonaceous fuel, and the desired weight fraction of the carbon in the liquid hydrocarbonaceous fuel feed to the reaction zone which is entrained as particulate carbon in the effluent gas stream leaving the reaction zone.

Accordingly, by means of a conventional flow rate sensor 105, the flow rate of the liquid hydrocarbonaceous fuel feedstock in line 24 is sensed on its way to reaction zone 5. Signal $E_5$ corresponding to said flow rate is provided to speed control unit 106 for pump 107 and to system control unit 101. In speed control unit 106, signal $E_5$ is automatically compared with a manually or computer calculated and inserted direct current voltage $V_1$ corresponding to the set point or desired flow rate. The flow rate of the liquid hydrocarbonaceous fuel is held at design conditions. When adjustment to the flow rate of the liquid hydrocarbonaceous fuel is required, speed controller 106 provides signal $E_6$ to adjust the speed of positive displacement feed pump 107 in line 23 in order to regulate by a certain proportion the rate of flow of the liquid hydrocarbonaceous fuel feedstream to gas generator 1. In one embodiment, signal $V_1$ is provided by system control unit 101.

By means of conventional flow rate sensor 108, the flow rate of the carbon-water dispersion in line 42 is sensed automatically on its way to a conventional carbon-recovery zone. Signal $E_7$, which corresponds to said flow rate, is provided to system control unit 101.

The weight fraction of carbon in one sample of carbon-water dispersion is determined by conventional type carbon analyzer means 46 and signal $E_8$ corresponding thereto is provided to system control unit 101. Carbon analyzer 46 may be for example of the type produced by Envirotech Corporation, Dohrmann Div., Santa Clara, California; or Astro Ecology Corp., Houston, Texas. By this means, over a predetermined period of time a plurality of different samples of the carbon-water dispersion from line 43 i.e. 2 to 5, say 3 samples are automatically taken in succession and separately analyzed for weight fraction of particulate carbon. Sampling intervals may be varied, for example by conventional timers in the range of about 5 to 55 minutes. The response time for each sample run may take about 5-15 minutes, such as 10 minutes. Then in system control unit 101, a signal corresponding to the average weight fraction of carbon in the carbon-water dispersion over a period of time, such as 10 to 210 minutes, say 15 to 45 minutes is determined. Signals representing the actual carbon-make and the relative difference between the actual and desired carbon-make in the reaction zone are then automatically determined. A value representing the % change to be made in the current rate of flow of the free-oxygen containing gas feedstream is then automatically determined in a comparator means. A signal corresponding to this value and a signal corresponding to the current rate of flow of the free-oxygen containing gas are provided to a multiplying means. A corresponding signal responsive thereto is then provided to a flow rate regulating means that automatically adjusts the current flow rate of the free-oxygen containing gas stream. For example, a signal from said multiplying means resets a flow recorder-control means such as a valve in the free-oxygen containing gas feedstream. In one embodiment, a control valve in the free-oxygen containing gas feedline is regulated by a direct signal from said multiplying means.

In the other trim control scheme, the actual temperature in the reaction zone may be automatically brought closer to the desired temperature established by design conditions by adjusting the flow rate of the temperature moderator stepwise up or down by discrete small amounts. In such case signals representing the actual temperature in the reaction zone of the gas generator and the relative difference between the actual and desired temperature in the reaction zone are automatically determined. A value representing the % change to be made in the current rate of flow of the temperature moderator feedstream is then automatically determined in a comparator means. A signal corresponding to this value and a signal corresponding to the current rate of flow of the temperature moderator are provided to a multiplying means. A corresponding signal responsive thereto is then provided to a flow rate regulating means that automatically adjusts the current flow rate of the temperature moderator feedstream. For example, a signal from said multiplying means is provided to a speed control means that provides an adjustment signal to a positive displacement pump in the temperature moderator feedline. By this means, the current flow rate of the temperature moderator stream is automatically adjusted by a corresponding small percentage. Alternatively, the signal from the multiplying means may be provided to a flow recorder control means which provides an adjustment signal to regulate a flow rate control means, such as a motorized valve, that automatically adjusts the flow rate of the temperature moderator feedstream.

In the subject embodiment, it was determined that the actual temperature in the reaction zone could be more accurately represented as a function of the methane equilibrium constant for the equation $2CO + 2H_2 = CH_4 + CO_2$ in the cooled and clean effluent gas stream. Accordingly, the value representing the actual temperature in the reaction zone is obtained by providing to system control unit 101 over a period of time with a plurality of equally spaced separate sets of signals with each set of signals corresponding to the mole fraction of each of the following constituents: $CO_2$, $CH_4$, $CO$ and $H_2$ (dry basis) in the cooled and clean effluent gas stream for that particular sample of the gas being analyzed. A set of signals representing the average mole fractions of $CO_2$, $CH_4$, and $H_2$ in the cooled and clean effluent gas stream over a predetermined period of time is then computed in system control unit 101. A value for the actual temperature in the reaction zone as a function of the methane equilibrium constant is then automatically computed for example according to Equation (I) below. The temperature of the reaction zone as determined thereby is not affected by hot spots or by the extreme temperatures prevailing within the gasifier. Accordingly, it is an improvement over conventional mechanical means for measuring temperatures.

$$T = \frac{A}{B - \operatorname{Ln} Keq} - 460 \qquad \text{Equation I}$$

where:

T is the actual temperature in the reaction zone (°F.);
Keq is the methane equilibrium constant and is equal to $$\frac{(CO)^2 (H_2)^2}{(CH_4)(CO_2)} \times P^2 \times W^2$$

where:

( ) is the average mole fraction of the gas constituent (dry basis) within the parenthesis; P is the absolute pressure of the cooled and cleaned effluent gas (atmospheres); W is representative of the moisture in the effluent gas from the reaction zone i.e. dry gas, moles/wet gas, moles; 1/W is directly proportional to the $H_2O$/fuel weight ratio in the feed i.e.

$$\frac{1}{2} \frac{(H_2O, \text{ lb. per hr.})}{(\text{liquid hydrocarbonaceous fuel, lb. per hr.})} + 1$$

and A and B are predetermined constants. With petroleum oil as the liquid hydrocarbonaceous fuel and $H_2O$ as the temperature moderator, at 400 psig A=55,930.7 and B=34.075.

Thus, the quench cooled and scrubbed effluent gas stream in line 52 is automatically sampled and analyzed for mole fractions of $CO_2$, $CH_4$, CO, $H_2$ (dry basis) in a conventional type gas analyzer means 77. Gas analyzer means 77 is a conventional type on-line mass spectrometer or a gas chromatograph system, for example of the type produced by Carle Instruments Inc., Anaheim, Calif., or Hewlett-Packard Corp., Palo Alto, Calif. By this means, over a predetermined period of time a plurality of different gas samples from line 52 i.e. about 2 to 5, say 3 samples are automatically taken in succession and each sample is separately analyzed for mole fractions of $CO_2$, $CH_4$, CO and $H_2$ (dry basis). Sampling intervals may be varied, for example by conventional timers in the range of about 5 to 55 minutes. The response time for each sample run is about 5–15, such as about 10 minutes. Signals $E_{12}$ to $E_{15}$ respectively representing the mole fractions of $CO_2$, $CH_4$, CO and $H_2$ (dry basis) in one sample of the cooled and cleaned effluent gas stream are provided to system control unit 101. Then in system control unit 101, signals corresponding to the average mole fractions of $CO_2$, $CH_4$, CO and $H_2$ (dry basis) over a period of time, each as 10 to 210 minutes, say 15 to 45 minutes are determined. From these signals and signals corresponding to the other terms in Equation I, a signal representing the actual temperature in the reaction zone is determined in system control unit 101. The pressure of the gas stream in line 53 is measured by pressure sensor 115 and signal $E_{16}$ corresponding thereto is provided to system control unit 101.

From signals $E_9$, $E_{12}$ to $E_{15}$, and others to be described in connection with FIG. 2, system control unit 101 provides signal $E_{10}$ or $E_{11}$ depending on the magnitude of a value representing the relative difference between the actual and desired temperature in the reaction zone. The value for the relative difference between the actual and desired temperature in the reaction zone is determined by the following relationship: Actual Temperature-Desired Temperature divided by Desired Temperature. The value for the desired temperature in the reaction zone may be determined by conventional calculations involving heat and weight balances and is dependent on such factors as the ash properties of the fuel, economics, and refractory life.

Signal $E_{10}$ corresponds to a specific trim adjustment to be made to the current flow rate for the temperature moderator i.e. $H_2O$ and is provided to a flow rate regulating means. For example, signal $E_{10}$ adjusts the set point of speed control 111 for pump 112 in water line 17. Speed control 111 provides signal $E_{19}$ to control pump 112 in order to increase or decrease the speed of pump 112. Alternatively, signal $E_{10}$ may be provided to reset a flow recorder-controller (not shown) which provides an adjustment signal to a control valve in the temperature moderator feedline. By this means the flow rate of the stream of temperature moderator in line 17 is automatically regulated a specific amount corresponding to a specific range of values representing the magnitude of the relative difference between the actual and desired temperature in the reaction zone. Thus for each adjustment, the flow rate of the temperature moderator in line 17 may be increased or decreased a specific small amount. For example, if water is the temperature moderator in line 17, by this means its flow rate may be adjusted in the range of about 0 to ±10 percent in predetermined small amounts.

Alarm signal $E_{11}$ from system control unit 101 corresponds to the relative difference between the actual and desired temperature in the reaction zone that is either higher or lower than a specific amount i.e. ±0.014. When signal $E_{11}$ is produced, the reaction zone temperature high-low level alarm 113 is actuated. For example, should there be called for a trim adjustment to the current water flow rate of a magnitude that exceeds plus or minus 10.0%, then said adjustment is not made but instead the high or low level alarm, respectively, will be actuated. The alarm may be visual, auditory, or both. By this means, the operator is alerted to adjust feedstream controls or to put equipment in or out of service for the following reasons: safety—to prevent costly damage to the equipment or harm to people; product—to operate the plant such that product specification is brought to the desired level and production rate targets are achieved; and efficiency—to operate the process economically.

Referring to FIGS. 1, 2 and 3, signal $E_8$ from carbon analyzer means 46 is provided to conventional type storage and averaging means 120, for example as shown in FIG. 3. Storage and averaging means 120 provides signal $E_{25}$ corresponding to the average of three successive determinations of the wt. fraction of carbon in the carbon-water dispersion in line 43 as determined by carbon analyzer means 46 in line 45 of FIG. 1.

As shown in FIG. 3, storage and averaging means 120 includes a conventional type analog-to-digital converter 121 which converts the present signal $E_8$ to digital signals which are applied to register 122. The entering of the digital signals in register 122 is controlled by pulse signal $E_{20}$ from a conventional type programming means 123, for example as shown in FIG. 4. Register 122 provides digital signals to a digital-to-analog converter 124 which converts the digital signals to an analog signal $E_{21}$ corresponding to the wt. fraction of carbon in carbon-water dispersion for the next previous sample. Register 122 also provides the digital signals to another register 125. The entry of the digital signals into register 125 is controlled by a pulse $E_{22}$ provided by programming means 123 as hereinafter explained. Register 125 stores and provides the digital signals to another digital-to-analog converter 126 which converts the digital signals to an analog signal $E_{23}$ corresponding to the wt. fraction of carbon in the carbon-water dispersion for the second next previous sample. Gating and adding means 127 adds together signals $E_8$, $E_{21}$, and $E_{23}$ to provide a signal $E_{24}$. A divider 128 divides signal $E_{24}$ by direct current voltage $V_2$ corresponding to the number of sample runs which is 3 for the subject example to provide signal $E_{25}$.

Referring to FIGS. 2, 3 and 4, programming means 123 receives a direct current voltage $V_{42}$. Voltage $V_{42}$ is applied to a conventional type on-off switch 160. Switch 160 may be activated automatically for example, by a signal from carbon analyzer 46 or programming means 169, or by an operator. When so activated voltage $V_{42}$ is applied to an AND gate 161. AND gate 161 is enabled by voltage $V_{42}$ from switch 160 and passes pulses $E_{45}$ from a conventionally programmed clock 159. The frequency of the pulses $E_{45}$ is related to the signals from the carbon analyzer and such variables as sampling interval, response time, and the moment in the control cycle. Each passed pulse from AND gate 161 triggers a one-shot multivibrator 162 causing it to provide an output pulse $E_{22}$. Pulse $E_{22}$ precedes pulse $E_{20}$ so that it registers 125 in storage means 120. Register 125 can receive the contents of register 122 before the contents of register 122 are changed by the occurrence of a pulse $E_{20}$.

Another one-shot multivibrator 163 acts as a time delay so that the information in the register 122 does not change while they are being entered into register 125. The time delay is determined by the width of the pulse provided by one-shot 163. The trailing edge of that pulse triggers yet another one-shot multivibrator 164 to provide pulse $E_{20}$. Pulse $E_{20}$ enters all of the signals corresponding to sensed data into register 122 so that they may be stored for use as data for the next previous cycle during a next subsequent cycle.

Referring to FIGS. 1 and 2, signal $E_7$ from flow rate sensor 108 corresponds to the flow rate of carbon-water dispersion leaving the gas quenching and scrubbing zone. Multiplier 130 multiplies signal $E_7$ with signal $E_{25}$ to provide signal $E_{26}$ corresponding to a value which is directly related to the actual flow rate of the particulate carbon that is discharged from the gasifier. Signal $E_5$ from flow rate sensor 105 in line 23 corresonds to the flow rate of the liquid hydrocarbonaceous fuel feedstock to the gas generator. Multiplier 131 multiplies signal $E_5$ with a direct current voltage $V_3$ to provide a signal $E_{27}$ which corresponds to the desired carbon-make with units of, for example, lbs. per hr. $V_3$ corresponds to a constant representing the weight fraction of carbon in the liquid hydrocarbonaceous fuel times the desired weight fraction of the carbon in the liquid hydrocarbonaceous fuel feed to the reaction zone which is entrained as particulate carbon in the effluent gas stream leaving the reaction zone. $V_3$ may be a value in the range of about 0.001 to 0.200, such as about 0.005 to 0.100, say about 0.010 to 0.03.

Signal means A provides signal $E_{30}$ representing the relative difference between the actual and desired amount of particulate carbon produced in the reaction zone for a specific period of time. Subtracting means 132 in signal means A subtracts signals $E_{27}$ from $E_{26}$ to provide signal $E_{28}$. A divider 133 divides signal $E_{28}$ by signal $E_{27}$ to provide signal $E_{30}$. Signal $E_{30}$ is provided to a conventional type comparator means 140.

Referring now to FIG. 5, comparator means 140, for example, represents a plurality of comparators 141–148 which receive signal $E_{30}$ and compare signal $E_{30}$ for a match with one of a plurality of direct current voltages from the group $V_5$ to $V_{12}$. $V_5$ to $V_{12}$ are manually or automatically inserted and correspond to a series of consecutive specific ranges of values (+ and −) for the relative difference between the actual and desired rate of free particulate carbon produced in the reaction zone. When a match between signal $E_{30}$ and one of the voltages $V_5$ to $V_{12}$ occurs, a corresponding signal is produced from the related comparator in the group 141–148. Switches 150 to 157 are associated with comparators 141–148 respectively. Direct current voltages $V_{15}$ to $V_{22}$ are associated with switches 150-157 respectively. $V_{15}$ to $V_{22}$ correspond to specific values (+ or −) for the % change to be made to the current flow rate of free-oxygen containing gas feedstream, or alternatively to a high-low level alarm signal. A signal from the comparator in the group 141–148 having a high output opens the related switch and the associated voltage passes. Thus with respect to the embodiment shown in Table I, signal $E_{32}$ from comparator unit 142 may represent a relative difference between the actual and desired rate of carbon produced of over +0.05 to +0.10, indicating an excess carbon-make and providing a high output to switch 151 of the bank of switches 150-157. Switch 151 is thereby rendered conductive and a direct current voltage $V_{16}$ corresponding to a specific % change of the current flow rate of free-oxygen containing gas in the amount of a +0.50% increment is passed as signal $E_{41}$. A multiplier 168 multiplies signal $E_{41}$ with signal $E_1$ representing the current flow rate of the free-oxygen containing gas to provide signal $E_2$ to flow recorder-controller 103 which provides signal $E_4$. Value 102 in line 15 is adjusted by signal $E_4$ to increase the flow rate of the free-oxygen containing gas feedstream by +0.50%. By this means the actual carbon-make is reduced and brought closer to the desired carbon-make in the reaction zone.

In another example, the relative difference between the actual and desired rate of carbon produced is over +0.25 (indicating an excess carbon-make), comparator 144 has a high output, and signal $E_{34}$ is provided to switch 153. Switch 153 is thereby rendered conductive and a direct current voltage $V_{18}$ corresponding to a high level alarm signal is passed as signal $E_3$ to the free-oxygen containing gas high-low level alarm unit 104. The operator then takes steps to reduce the amount of particulate carbon being produced.

In one embodiment, comparator means 140 may be programmed as shown in Table I below.

TABLE I

| | COMPARATOR MEANS 140 | | | | |
|---|---|---|---|---|---|
| Comparator Unit | Voltage | *Corresponding To The Relative Difference Between Actual and Desired Rate of C-Prod. | Switch | Voltage | #Corresponding To The % Change To Be Made To The Current Flow Rate of Free-$O_2$ Gas |
| 141 | $V_5$ | up to +0.05 | 150 | $V_{15}$ | 0.0 |
| 142 | $V_6$ | over +0.05 to +0.10 | 151 | $V_{16}$ | +0.50 |
| 143 | $V_7$ | over +0.10 to +0.25 | 152 | $V_{17}$ | +1.5 |
| 144 | $V_8$ | over +0.25 | 153 | $V_{18}$ | High Level Alarm |
| 145 | $V_9$ | up to −0.05 | 154 | $V_{19}$ | 0.0 |
| 146 | $V_{10}$ | over −0.05 to −0.10 | 155 | $V_{20}$ | −0.50 |
| 147 | $V_{11}$ | over −0.10 to −0.25 | 156 | $V_{21}$ | −1.50 |
| 148 | $V_{12}$ | over −0.25 | 157 | $V_{22}$ | Low Level Alarm |

*Relative Difference = $\frac{\text{Actual} - \text{Desired Rate of Carbon Production}}{\text{Desired Rate of Carbon Production}}$

A plus sign indicates the specific adjustment will increase the current flow rate of the free-oxygen containing gas by the amount shown; a minus sign indicates the specific adjustment will decrease the current flow rate of the free-$O_2$ gas by the amount shown.

Referring again to FIGS. 1 and 2 and the scheme for trim controlling the temperature moderator stream in order to monitor the temperature in the reaction zone, periodically a set of signals $E_{12}$ to $E_{15}$ from gas analyzer means 77 are automatically provided to conventional type storage and averaging means 170. The construction and operation of storage and averaging means 170 and 120 are based on the same principles. By this means three, for example, sequential sets of signals $E_{12}$ to $E_{15}$ representing three separate analyzed samples of gas may be handled in 170 in a manner similar to the way that three sequential signals $E_8$ representing three separate carbon determinations were handled in 120. Accordingly a drawing of storage and averaging means 170 would be redundant. Storage and averaging means 170 provides signals $E_{50}$ to $E_{53}$ corresponding respectively to the average of three successive determinations of mole fractions of $CO_2$, $CH_4$, CO and $H_2$ (dry basis) in the cleaned and cooled effluent gas stream in line 52 made over a predetermined period of time.

The entry of the digital signals into the registers in 170 is controlled by conventional type programming means 169. Programming means 169 receives a direct current voltage $V_{43}$ and provides pulses $E_{55}$ and $E_{56}$. The construction and operation of programming means 169 is based on the same principles as those previously described with respect to programming means 123 so that no additional drawing is required. In one embodiment, conventional programming means connected to storage and averaging means 120 and 170, to carbon analyzer 46, and to gas analyzer 77 are employed for controlling the operation of the subject control system.

Signal Means B in FIG. 2 provides signal $E_{66}$ corresponding to the actual temperature (T) in the reaction zone as determined by Equation I. Signal Means D provides to Signal Means B the Signal $E_{18}$ corresponding to the product of $W^2$ and $P^2$ in Equation I.

Thus, in Signal Means B, signals $E_{53}$ and $E_{52}$ respectively corresponding to the average mole fractions of $H_2$ and CO (dry basis) in the process gas stream are squared and multiplied together in multiplier 172 to provide signal $E_{59}$. Signals $E_{51}$ and $E_{50}$ respectively corresponding to the average mole fractions of $CH_4$ and $CO_2$ (dry basis) in the process gas stream are multiplied together by multiplier 173 to provide signal $E_{60}$. Divider 174 divides signal $E_{59}$ by $E_{60}$ to provide signal $E_{61}$. Signals $E_{61}$ and $E_{18}$ are multiplied together by multiplier 171 to provide signal $E_{62}$ corresponding to Keq in Equation I i.e.

$$\frac{(CO)^2 (H_2)^2}{(CH_4)(CO_2)} \times P^2 \times W^2$$

$Log_e$ of Keq is provided as signal $E_{63}$ when signal $E_{62}$ is applied to natural logarithm function generator 175. Subtracting means 176 subtracts signal $E_{63}$ from direct current voltage $V_{45}$ representing the constant B in Equation I to provide a signal $E_{64}$ corresponding to the denominator of Equation I. A divider 177 divides a direct current voltage $V_{46}$ representing the constant A in Equation I by signal $E_{64}$ to provide signal $E_{65}$. Subtracting means 178 subtracts a direct current voltage $V_{47}$ corresponding to a constant 460 from signal $E_{65}$ to provide signal $E_{66}$ corresponding to the term T in Equation I.

In Signal Means D, divider 200 divides signal $E_9$ corresponding to the flow rate of the steam (temperature moderator) by signal $E_5$ corresponding to the flow rate of the liquid hydrocarbonaceous fuel feed to provide signal $E_{80}$. Multiplier 201 multiplies signal $E_{80}$ and direct voltage $V_{60}$ representing the constant ½ to provide signal $E_{81}$. Direct voltage $V_{61}$ representing the constant 1 is added to signal $E_{81}$ by adding means 202 to provide signal $E_{82}$ corresponding to 1/W. Signal $E_{83}$ corresponding to W in Equation I is provided by divider 203 which divides direct voltage $V_{62}$ representing the constant 1 by signal $E_{82}$. Multiplier 204 multiplies signal $E_{83}$ by itself to provide signal $E_{84}$ representing $W^2$. Multiplier 205 provides signal $E_{18}$ representing $P^2 \times W^2$ in Equation I by multiplying signals $E_{84}$ and $E_{17}$. Signal $E_{16}$, corresponding to the pressure of the clean product gas in line 53, is squared by multiplier 206.

Signal Means C provides signal $E_{68}$ corresponding to the relative difference between the actual and desired temperatures in the reaction zone. Subtracting means 179 in Signal Means C subtracts direct current voltage $V_{48}$ corresponding to the desired temperature in the reaction zone in the range of 1700° to 3000° F., say 2200° to 2800° F. from signal $E_{66}$ representing the actual temperature in the reaction zone to provide signal $E_{67}$. $V_{48}$ is a manual or automatically computed and inserted input signal based on design conditions. Divider 180 divides $E_{67}$ by $V_{48}$ to provide signal $E_{68}$.

Comparator means 185 and 140 are similar in design and operation so that a new drawing is not required. Comparator means 185 comprises a plurality of comparators 250 to 257 which receive signal $E_{68}$ and compares it for a match with one of a plurality of direct current voltages from the group $V_{60}$ to $V_{67}$. $V_{60}$ to $V_{67}$ are manually or automatically inserted and correspond to a series of consecutive specific ranges of values (+ or −) for the relative difference between the actual and desired temperature. When a match between signal $E_{68}$ and one of the voltages $V_{60}$ to $V_{67}$ occurs, a corresponding signal is produced from the related comparator in the group 250 to 257 in the reaction zone. Switches 260 to 267 are associated with comparators 250 to 257 respectively. Direct current voltages $V_{70}$ to $V_{77}$ are associated with switches 260 to 267 respectively. $V_{70}$ to $V_{77}$ correspond to specific values (+ or −) of the % change to be made to the current flow rate of temperature moderator feedstream, or alternatively to a high-low level alarm signal.

Any signal leaving comparator means 185 to effect a change in the current flow rate of the temperature moderator by a specific percentage such as $E_{70}$ is multiplied in multiplier 187 by signal $E_9$ corresponding to the current flow rate of the temperature moderator feedstream as provided by conventional flow rate sensor 110. Signal $E_{10}$ is thereby provided for the adjustment of speed control 111 for pump 12 in line 17 of the process water feedstream. Alternatively, an alarm signal $E_{11}$ is passed to reaction zone temperature high-low level alarm unit 113 in FIG. 1. In one embodiment, comparator means 185 may be programmed as shown in Table II below. For example, signal $E_{68}$ from comparator unit 205 may represent a relative difference between the actual and desired temperatures of over −0.004 to 0.010, indicating a temperature in the reaction zone that is too low and providing a high output to switch 215 of the bank of switches 210–217. Switch 215 is thereby rendered conductive and a direct current voltage $V_{75}$ corresponding to a specific % change of the current flow rate of the temperature moderator feedstream in the decreased amount of −5.0% is passed as signal $E_{70}$. Signal $E_{10}$ to speed control 111 would then result in a reduction of the speed of pump 112 so as to reduce the current flow rate of the water feedstream by −5.0%. This would result in a corresponding increase of the actual temperature in the reaction zone. In the embodiment for only controlling the temperature in the reaction zone, after conditions in the reaction zone have stabilized the aforesaid steps are repeatedly cycled.

previously described and flow rate of the free-oxygen containing gas feedstream is adjusted. After conditions in the gas generator are allowed to stabilize for a first stabilization period in the range of about 5 to 30 minutes, such as 15 minutes, signal $E_{57}$ is provided to programming means 169 and the flow rate of the temperature moderator feedstream is adjusted in the manner described previously. After the gas generator is allowed to stabilize for a second stabilization period in the range of about 5 to 30 minutes, such as 15 minutes, signal $E_{58}$ is provided to programming means 123 and the trim control cycle is repeated with the adjustment of the flow rate of the free-oxygen containing gas feedstream and the overall system control procedure is repeatedly cycled. During the stabilization period, the temperature, pressure, gas composition, and carbon-make in the reaction zone settle down to normal random fluctuations.

In still another embodiment, programming means 123 is programmed so that upon demand a small adjustment is made to the current flow rate of the free-oxygen containing gas in the manner described previously. The magnitude of each adjustment, if any, or alternatively the operation of a high-low level alarm is a function of the relative difference between the actual and desired carbon-make, in the manner described previously. A gasifier stabilization period in the range of about 5 to 30, such as 15 minutes follows each adjustment. The cycle is then repeated. In another embodiment, the cycle for trim controlling the carbon-make is repeated until the relative difference between the actual and desired carbon-make falls within a predetermined range, for example ±0.05. At that point and after the stabilization period, signal $E_{57}$ is provided to programming means 169 so that upon demand a small adjustment is made to the current flow rate of the temperature moderator feedstream in the manner described previously to trim control the temperature of the gasifier. The magnitude of the adjustment, if any, or alternatively the operation of a high-low level alarm is a function of the relative difference between the actual and desired temperature in the reaction zone. After a gasifier stabilization period in the range of about 5 to 30, such as 15 minutes, the trim control cycle for the free-oxygen containing gas feedstream is repeated, and the overall system control cycle is repeatedly cycled.

TABLE II

COMPARATOR MEANS 185

| Comparator Unit | Voltage | *Corresponding To The Relative Difference Between Actual and Desired Temperature | Switch | Voltage | #Corresponding To The % Change To Be Made To The Current Flow Rate of Temperature Moderator |
|---|---|---|---|---|---|
| 200 | $V_{60}$ | up to +0.004 | 210 | $V_{70}$ | 0.0 |
| 201 | $V_{61}$ | over +0.004 to +0.010 | 211 | $V_{71}$ | +5.0 |
| 202 | $V_{62}$ | over +0.010 to +0.014 | 212 | $V_{72}$ | +10.0 |
| 203 | $V_{63}$ | over +0.014 | 213 | $V_{73}$ | High Level Alarm |
| 204 | $V_{64}$ | up to −0.004 | 214 | $V_{74}$ | 0.0 |
| 205 | $V_{65}$ | over −0.004 to −0.010 | 215 | $V_{75}$ | −5.0 |
| 206 | $V_{66}$ | over −0.010 to −0.014 | 216 | $V_{76}$ | −10.0 |
| 207 | $V_{67}$ | over −0.014 | 217 | $V_{77}$ | Low Level Alarm |

*Relative Difference = $\frac{\text{Actual} - \text{Desired Temperature In Reaction Zone}}{\text{Desired Temperature In Reaction Zone}}$

A plus sign indicates the specific adjustment will increase the current flow rate of the temperature moderator by the amount shown; and, a minus sign indicates the specific adjustment will decrease the current flow rate by the amount shown.

Programming means 123 and 169 are linked together in one embodiment by signals $E_{57}$ and $E_{58}$. In such case programming means 123 is employed in the manner Although modifications and variations of the invention may be made without departing from the spirit and scope thereof, only such limitations should be imposed as are indicated in the appended claims.

We claim:

1. In a partial oxidation process for reacting a liquid hydrocarbonaceous fuel feedstream and a free-oxygen containing gas feedstream in the presence of a temperature moderator in the reaction zone of a refractory lined free-flow noncatalytic gas generator at a temperature in the range of about 1700° to 3000° F. and a pressure in the range of about 1 to 300 atmospheres to produce an effluent gas stream comprising $H_2$, CO, $CH_4$, $CO_2$, particulate carbon and at least one material from the group consisting of $H_2O$, $H_2S$, COS, $N_2$, and Ar; and cleaning and cooling the effluent gas stream with water in a gas quenching and cleaning zone to remove substantially all of the entrained particulate carbon as a stream of carbon-water dispersion and to produce a cooled and cleaned effluent gas stream; the improved method for controlling the amount of unconverted particulate carbon in the effluent gas stream leaving the reaction zone comprising:

(1) periodically determining the flow rate of the feedstream of liquid hydrocarbonaceous fuel and generating a liquid hydrocarbonaceous fuel flow rate signal responsive thereto;

(2) automatically computing the desired rate of production for the unconverted particulate carbon produced in the reaction zone, in accordance with the signal generated in (1) and a direct current voltage corresponding to the weight fraction of carbon in said liquid hydrocarbonaceous fuel times the desired weight fraction of carbon in the liquid hydrocarbonaceous fuel feed which is entrained as particulate carbon in the effluent gas stream leaving the reaction zone, and generating a corresponding signal responsive thereto;

(3) periodically determining the flow rate for the stream of carbon-water dispersion, and generating a corresponding carbon-water dispersion flow rate signal responsive thereto;

(4) automatically sampling and analyzing over a period of time a plurality of samples of the stream of carbon-water dispersion in succession, and generating corresponding signals responsive thereto each successive signal representing the weight fraction of particulate carbon;

(5) automatically storing and computing the average of said plurality of the signals generated in (4), and generating a corresponding signal responsive thereto representing the average weight fraction of particulate carbon;

(6) automatically computing the actual rate of production for the unconverted particulate carbon produced in the reaction zone and recovered in the carbon-water dispersion in accordance with the signals generated in (3) and (5), and generating a corresponding signal responsive thereto;

(7) automatically computing the relative difference between the actual and desired rates of production of unconverted particulate carbon in accordance with the signals generated in (2) and (6), and generating a corresponding signal responsive thereto;

(8) periodically determining the flow rate for the feedstream of free-oxygen containing gas, and generating a corresponding free-oxygen containing gas flow rate signal responsive thereto;

(9) automatically comparing the signal generated in (7) for a match with one of a plurality of direct current voltages corresponding to a series of values (+ and −) representing the relative difference between the actual and desired rates of production of unconverted particulate carbon, and responsive thereto providing a related signal corresponding to the % change to be made in the current flow rate for the free-oxygen containing gas feedstream in order to bring closer the current and desired flow rates for the free-oxygen containing gas, or alternatively providing a particulate carbon high or low level alarm signal;

(10) automatically multiplying the signal from (9) corresponding to the % change to be made in the current flow rate for the free-oxygen containing gas feedstream by a signal corresponding to the current flow rate for the free-oxygen containing gas feedstream to provide a signal to adjust the flow rate regulating means for the free-oxygen containing gas feedstream;

(11) automatically adjusting the flow rate of the free-oxygen containing gas feedstream, or alternatively actuating an alarm means in response to the signals generated in (10) or (9), respectively;

(12) stabilizing conditions in the reaction zone; and

(13) repeatedly cycling steps (1) to (12).

2. The process of claim 1 provided with the following additional steps after step (12):

(a) periodically determining the pressure of said cooled and cleaned effluent gas stream and generating a corresponding signal responsive thereto;

(b) periodically determining the current flow rate of said feedstream of temperature moderator and generating a signal responsive thereto;

(c) automatically sampling and analyzing over a period of time a plurality of samples of the cooled and cleaned effluent gas stream in succession, and generating corresponding separate sets of signals responsive thereto each successive set of signals representing the mole fractions of $CO_2$, $CH_4$, CO and $H_2$ (dry basis);

(d) automatically storing and computing the average of the plurality of separate sets of signals generated in (c), and generating corresponding signals responsive thereto representing the average mole fractions of $CO_2$, $CH_4$, CO and $H_2$ (dry basis);

(e) producing a signal representative of the moisture in the effluent gas from the reaction zone;

(f) automatically computing a value representing the actual temperature in the reaction zone of the gas generator as a function of the methane equilibrium constant from the signals generated in (a), (d), (e), and direct input signals representing constants; and generating a corresponding signal responsive thereto;

(g) automatically computing the relative difference between the actual temperature as represented by the value derived in (f) and the desired temperature in the reaction zone, and generating a corresponding signal responsive thereto in accordance with the signal generated in (f) and a manual or automatically computed input signal representing the desired temperature in the reaction zone;

(h) automatically comparing the signal generated in (g) for a match with one of a plurality of direct current voltages corresponding to a series of values (+ and −) representing the relative difference between the actual temperature as represented by the value derived in (f) and the desired temperature in the reaction zone, and responsive thereto providing a related signal corresponding to the % change to be made in the current flow rate for the temperature moderator feedstream in order to bring closer the current and desired flow rates for the temperature moderator feedstream; or alternatively providing a reaction zone temperature high-low level alarm signal;

(i) automatically multiplying the signal from (h) corresponding to the % change to be made in the current flow rate for the temperature moderator feedstream by a signal corresponding to the current flow rate for the temperature moderator feedstream from (b) to provide a signal to adjust the flow rate regulating means for the temperature moderator feedstream;

(j) automatically adjusting the flow rate of the temperature moderator feedstream, or alternatively actuating an alarm means in response to the signals generated in (i) and (h), respectively;

(k) stabilizing conditions in the gas generator; and (l) repeatedly cycling the overall system control procedure as previously specified for controlling the amount of unconverted carbon in the effluent gas stream in steps (1) to (12), followed by adjusting the temperature in the reaction zone by steps (a) to (k).

3. In a partial oxidation process for reacting a liquid hydrocarbonaceous fuel feedstream and a free-oxygen containing gas feedstream in the presence of a temperature moderator in the reaction zone of a refractory lined free-flow noncatalytic gas generator at a temperature in the range of about 1700° to 3000° F. and a pressure in the range of about 1 to 300 atmospheres to produce an effluent gas stream comprising $H_2$, $CO$, $CH_4$, $CO_2$, particulate carbon and at least one material from the group consisting of $H_2O$, $H_2S$, $COS$, $N_2$ and $Ar$; and cleaning and cooling said effluent gas stream with water in a gas quenching and cleaning zone to remove substantially all of said entrained particulate carbon as a stream of carbon-water dispersion and to produce a cooled and cleaned effluent gas stream; the improved method for controlling the temperature in the reaction zone comprising:

(a) periodically determining the pressure of said cooled and cleaned effluent gas stream and generating a corresponding signal responsive thereto;

(b) periodically determining the current flow rate of said feedstream of temperature moderator and generating a signal responsive thereto;

(c) automatically sampling and analyzing over a period of time a plurality of samples of the cooled and cleaned effluent gas stream in succession, and generating corresponding separate sets of signals responsive thereto each successive set of signals representing the mole fractions of $CO_2$, $CH_4$, $CO$ and $H_2$ (dry basis);

(d) automatically storing and computing the average of the plurality of separate sets of signals generated in (c), and generating corresponding signals responsive thereto representing the average mole fractions of $CO_2$, $CH_4$, $CO$ and $H_2$ (dry basis);

(e) producing a signal representative of the moisture in the effluent gas from the reaction zone;

(f) automatically computing a value representing the actual temperature in the reaction zone of the gas generator as a function of the methane equilibrium constant from the signals generated in (a), (d), (e), and direct input signals representing constants; and generating a corresponding signal responsive thereto;

(g) automatically computing the relative difference between the actual temperature as represented by the value derived in (f) and the desired temperature in the reaction zone, and generating a corresponding signal responsive thereto in accordance with the signal generated in (f) and a manual or automatically computed input signal representing the desired temperature in the reaction zone;

(h) automatically comparing the signal generated in (g) for a match with one of a plurality of direct current voltages corresponding to a series of values (+ and −) representing the relative difference between the actual temperature as represented by the value derived in (f) and the desired temperature in the reaction zone, and responsive thereto providing a related signal corresponding to the % change to be made in the current flow rate for the temperature moderator feedstream in order to bring closer the current and desired flow rates for the temperature moderator feed-stream; or alternatively providing a reaction zone temperature high-low level alarm signal;

(i) automatically multiplying the signal from (h) corresponding to the % change to be made in the current flow rate for the temperature moderator feedstream by a signal corresponding to the current flow rate for the temperature moderator feedstream from (b) to provide a signal to adjust the flow rate regulating means for the temperature moderator feedstream;

(j) automatically adjusting the flow rate of the temperature moderator feedstream, or alternatively actuating an alarm means in response to the signals generated in (i) and (h), respectively;

(k) stabilizing conditions in the gas generator; and (l) repeatedly cycling the overall system control procedure as previously specified for adjusting the temperature in the reaction zone by steps (a) to (k).

4. In a partial oxidation process for reacting a liquid hydrocarbonaceous fuel feedstream and a free-oxygen containing gas feedstream in the presence of a temperature moderator in the reaction zone of a refractory lined free-flow noncatalytic gas generator at a temperature in the range of about 1700° to 3000° F. and a pressure in the range of about 1 to 300 atmospheres to produce an effluent gas stream comprising $H_2$, $CO$, $CH_4$, $CO_2$, particulate carbon and at least one material from the group consisting of $H_2O$, $H_2S$, $COS$, $N_2$, and $Ar$; and cleaning and cooling the effluent gas stream with water in a gas quenching and cleaning zone to remove substantially all of said entrained particulate carbon as a stream of carbon-water dispersion and to produce a cooled and cleaned effluent gas stream; the improved method for controlling the amount of unconverted particulate carbon in the effluent gas stream leaving the reaction zone and for controlling the temperature in the reaction zone comprising:

(1) periodically determining the flow rate of the feedstream of liquid hydrocarbonaceous fuel and generating a liquid hydrocarbonaceous fuel flow rate signal responsive thereto;

(2) automatically computing the desired rate of production for the unconverted particulate carbon produced in the reaction zone, in accordance with the signal generated in (1) and a direct current voltage corresponding to the weight fraction of carbon in said liquid hydrocarbonaceous fuel times the desired weight fraction of carbon in the liquid hydrocarbonaceous fuel feed which is entrained as particulate carbon in the effluent gas stream leaving the reaction zone, and generating a corresponding signal responsive thereto;

(3) periodically determining the flow rate for the stream of carbon-water dispersion, and generating a corresponding carbon-water dispersion flow rate signal responsive thereto;

(4) automatically sampling and analyzing over a period of time a plurality of samples of the stream of carbon-water dispersion in succession, and generating corresponding signals responsive thereto each successive signal representing the weight fraction of particulate carbon;

(5) automatically storing and computing the average of said plurality of the signals generated in (4), and generating a corresponding signal responsive thereto representing the average weight fraction of particulate carbon;

(6) automatically computing the actual rate of production for the unconverted particulate carbon produced in the reaction zone and recovered in the carbon-water dispersion in accordance with the signals generated in (3) and (5), and generating a corresponding signal responsive thereto;

(7) automatically computing the relative difference between the actual and desired rates of production of unconverted particulate carbon in accordance with the signals generated in (2) and (6), and generating a corresponding signal responsive thereto;

(8) periodically determining the flow rate for the feedstream of free-oxygen containing gas, and generating a corresponding free-oxygen containing gas flow rate signal responsive thereto;

(9) automatically comparing the signal generated in (7) for a match with one of a plurality of direct current voltages corresponding to a series of values (+ and −) representing the relative difference between the actual and desired rates of production of unconverted particulate carbon, and responsive thereto providing a related signal corresponding to the % change to be made in the current flow rate for the free-oxygen containing gas feedstream in order to bring closer the current and desired flow rates for the free-oxygen containing gas, or alternatively providing a particulate carbon high or low level alarm signal;

(10) automatically multiplying the signal from (9) corresponding to the % change to be made in the current flow rate for the free-oxygen containing gas feedstream by a signal corresponding to the current flow rate for the free-oxygen containing gas feedstream to provide a signal to adjust the flow rate regulating means for the free-oxygen containing gas feedstream;

(11) automatically adjusting the flow rate of the free-oxygen containing gas feedstream, or alternatively actuating an alarm means in response to the signals generated in (10) or (9), respectively;

(12) stabilizing conditions in the reaction zone;

(13) repeatedly cycling steps (1) to (12) until the signal generated in step (7) corresponds to a value which falls within a predetermined range;

(14) periodically determining the pressure of said cooled and cleaned effluent gas stream and generating a corresponding signal responsive thereto;

(15) periodically determining the current flow rate of said feedstream of temperature moderator and generating a signal responsive thereto;

(16) automatically sampling and analyzing over a period of time a plurality of samples of the cooled and cleaned effluent gas stream in succession, and generating corresponding separate sets of signals responsive thereto each successive set of signals representing the mole fractions of $CO_2$, $CH_4$, CO and $H_2$ (dry basis);

(17) automatically storing and computing the average of the plurality of separate sets of signals generated in (16), and generating corresponding signals responsive thereto representing the average mole fractions of $CO_2$, $CH_4$, CO and $H_2$ (dry basis);

(18) producing a signal representative of the moisture in the effluent gas from the reaction zone;

(19) automatically computing a value representing the actual temperature in the reaction zone of the gas generator as a function of the methane equilibrium constant from the signals generated in (14), (17), (18), and direct input signals representing constants; and generating a corresponding signal responsive thereto;

(20) automatically computing the relative difference between the actual temperature as represented by the value derived in (19) and the desired temperature in the reaction zone, and generating a corresponding signal responsive thereto in accordance with the signal generated in (19) and a manual or automatically computed input signal representing the desired temperature in the reaction zone;

(21) automatically comparing the signal generated in (20) for a match with one of a plurality of direct current voltages corresponding to a series of values (+ and −) representing the relative difference between the actual temperature as represented by the value derived in (19) and the desired temperature in the reaction zone, and responsive thereto providing a related signal corresponding to the % change to be made in the current flow rate for the temperature moderator feedstream in order to bring closer the current and desired flow rates for the temperature moderator feedstream; or alternatively providing a reaction zone temperature high-low level alarm signal;

(22) automatically multiplying the signal from (21) corresponding to the % change to be made in the current flow rate for the temperature moderator feedstream by a signal corresponding to the current flow rate for the temperature moderator feedstream from (15) to provide a signal to adjust the flow rate regulating means for the temperature moderator feedstream;

(23) automatically adjusting the flow rate of the temperature moderator feedstream, or alternatively actuating an alarm means in response to the signals generated in (22) and (21), respectively;

(24) stabilizing conditions in the gas generator; and

(25) repeatedly cycling the overall system control procedure as previously specified for controlling the amount of unconverted carbon in the effluent gas stream in steps (1) to (13), and then adjusting the temperature in the reaction zone by steps (14) to (24).

5. The process of claims 1, 2 or 4 where in step (9) the signal generated in (7) is compared for a match with direct current voltages corresponding to the values listed in the first column below, and responsive to said comparison a signal corresponding to the related value listed in the second column below is provided for that value in the first column that was matched:

| Relative Difference Between Actual And Desired Rates Of Production of Unconverted Particulate Carbon | % Change to Be Made in the Current Flow Rate For The Free-Oxygen Containing Gas |
|---|---|
| up to +0.05 | 0.0 |
| over +0.05 to +0.10 | +0.50 |
| over +0.10 to +0.25 | +1.5 |

-continued

| Relative Difference Between Actual And Desired Rates Of Production of Unconverted Particulate Carbon | % Change to Be Made in the Current Flow Rate For The Free-Oxygen Containing Gas |
|---|---|
| over +0.25 | High Level Alarm |
| up to −0.05 | 0.0 |
| over −0.05 to −0.10 | −0.50 |
| over −0.10 to −0.25 | −1.50 |
| over −0.25 | Low Level Alarm |

6. The process of claims 1, 2 or 4 where in step (2) the signal generated in step (1) is multiplied by said direct current voltage corresponding to a constant having a value in the range of about 0.001 to 0.200.

7. The process of claims 1, 2 or 4 where the adjustment signal from step (10) is provided directly to regulate a control valve in the free-oxygen containing gas feed line so that the rate of flow of the free-oxygen containing gas feedstream may be increased or decreased.

8. The process of claims 1, 2 or 4 with the steps of providing the adjustment signal from step (10) to reset a flow recorder-controller which provides an adjustment signal to regulate a control valve in the free-oxygen containing gas feed line so as to increase or decrease the rate of flow of the free-oxygen containing gas feedstream.

9. The process of claims 3 or 4 with the steps of providing the adjustment signal from step (i) or step (22) respectively to a pump speed control means; and regulating the speed of a pump for the temperature moderator so as to increase or decrease the rate of flow of the temperature moderator feedstream in response to a signal provided by the speed control means.

10. The process of claims 1, 2, 3 or 4 in which said liquid hydrocarbonaceous fuel is a liquid hydrocarbon selected from the group consisting of liquefied petroleum gas, petroleum distillates and residua, gasoline, naphtha, kerosine, crude petroleum, asphalt, gas oil, residual oil, tar-sand oil and shale oil, coal derived oil, aromatic hydrocarbons (such as benzene, toluene, xylene fractions), coal tar, cycle gas oil from fluid-catalytic-cracking operations, furfural extract of coker gas oil, and mixtures thereof.

11. The process of claims 1, 2, 3 or 4 in which said liquid hydrocarbonaceous fuel is an oxygenated hydrocarbonaceous organic material from the group consisting of carbohydrates, cellulosic materials, aldehydes, organic acids, alcohols, ketones, oxygenated fuel oil, waste liquids and by-products from chemical processes for oxygenated hydrocarbonaceous organic materials, and mixtures thereof.

12. The process of claims 1, 2, 3 or 4 in which said liquid hydrocarbonaceous fuel is a pumpable slurry of a low-ash solid carbonaceous fuel in a liquid carrier from the group consisting of water, liquid hydrocarbon fuel, and mixtures thereof.

13. The process of claim 11 wherein said solid carbonaceous fuel has an ash content of about 1.0 weight percent or less and is selected from the group consisting of coal, lignite, coke from coal, char from coal, coal liquefaction residues, particulate carbon, petroleum coke, solids derived from oil shale, tar sands and pitch, concentrated sewer sludge, bits of garbage, rubber, and mixtures thereof.

14. The process of claims 1, 2, 3 or 4 in which said free-oxygen containing gas is selected from the group consisting of air, oxygen-enriched-air (22 mole % $O_2$ and higher) and substantially pure oxygen (95 mole % oxygen and higher).

15. The process of claims 1, 2, 3 or 4 in which said temperature moderator is selected from the group consisting of $H_2O$, $CO_2$, $N_2$, a cooled portion of effluent gas from the gas generator, and mixtures thereof.

16. The process of claims 2 or 3 where in step (h) the signal generated in (g) is compared for a match with direct current voltages corresponding to the values listed in the first column below and responsive to said comparison a signal corresponding to the related value listed in the second column below is provided for that value in the first column that was matched:

| Relative Difference Between The Temperature Derived in Step (f) And The Desired Temperature in Reaction Zone | % Change To Be Made in the Current Flow Rate For The Temperature Moderator |
|---|---|
| up to +0.004 | 0.0 |
| over +0.004 to +0.01 | +5.0 |
| over +0.01 to +0.014 | +10.0 |
| over +0.014 | High Level Alarm |
| up to −0.004 | 0.0 |
| over −0.004 to −0.01 | −5.0 |
| over −0.01 to −0.014 | −10.0 |
| over −0.014 | Low Level Alarm |

17. The process of claims 2, 3 or 4 wherein the actual temperature in the reaction zone of said gas generator is related to the methane equilibrium constant by the following equation:

$$T \leq \frac{A}{B - \text{Ln } Keq} - 460$$

where:
T is the actual temperature in the reaction zone (°F);
Keq is the methane equilibrium constant and is equal to $$\frac{(CO)^2 (H_2)^2}{(CH_4)(CO_2)} \times P^2 \times W^2$$

( ) represents the average mole fraction (dry basis) of the gas constituent within the parenthesis; P is the absolute pressure of the cooled and cleaned effluent gas (atmospheres); W is representative of the moisture in the effluent gas from the reaction zone;
A and B are constants
and wherein the liquid hydrocarbon fuel is petroleum oil, the temperature moderator is water, the pressure P=28.2 atmospheres, the constant A=55,930.7, the constant B=34.075; and $$1/w = \frac{1}{2} \frac{H_2O, \text{ lb. per hr.}}{\text{liquid hydrocarbonaceous fuel, lb. per hr.}} + 1$$

* * * * *